Figure 1:

Sept. 5, 1967   A. M. ALPER ET AL   3,340,077
FUSED CAST REFRACTORY

Filed Feb. 24, 1965   2 Sheets-Sheet 1

INVENTORS
Allen M. Alper
Robert C. Doman
Robert N. McNally

INVENTORS
Allen M. Alper
Robert C. Doman
Robert N. McNally

United States Patent Office 3,340,077
Patented Sept. 5, 1967

3,340,077
FUSED CAST REFRACTORY
Allen M. Alper, Corning, and Robert C. Doman and Robert N. McNally, Horseheads, N.Y., assignors to Corning Glass Works, Corning, N.Y., a corporation of New York
Filed Feb. 24, 1965, Ser. No. 434,812
20 Claims. (Cl. 106—56)

This invention relates to monolithic refractory ceramic blocks or articles of manufacture commonly known as fused cast refractory. This type of refractory article is most customarily produced by melting refractory ceramic raw material and pouring the molten material into a preformed mold to solidify as a monolithic casting therein. It is also known that in some cases fused cast refractory can be produced by solidifying the molten material in situ within the crucible or furnace container in which it was melted.

More specifically, the invention relates to novel fused cast refractory comprising free carbon intermingling with metallic boride crystals and/or borocarbide (or carboboride) crystals such that the refractory exhibits highly superior resistance to thermal or heat shock and, in most cases, has unusually excellent oxidation resistance at temperatures as high as about 1000° C. or more. Furthermore, another aspect of the invention relates to such novel fused cast refractory that exhibits excellent resistance to corrosion and erosion by molten ferrous metal and the ferruginous lime slags in reducing atmosphere environments as is commonly found in the basic oxygen steelmaking furnace processes, such as the Stora-Kaldo process. These slags usually have a lime-silica ratio of 1:1 to 1.5:1 at the early stage of a heat and the ratio increases toward the end of a heat to usually in excess of 2.5:1 for the higher lime finishing slags. The reducing atmosphere tends to be predominantly carbon monoxide. Moreover, in a further aspect of this invention, refractory is provided with a corrosion resistance that may make it desirable for contacting or containing other molten metals or alloys and their slags, drosses, etc. (e.g. manganese, nickel, cobalt, aluminum, copper, zinc, tin, lead, etc.).

Heretofore, it has been known to produce friable masses of metal borides and of metal carbides by reacting suitable raw materials at elevated temperatures. Ordinarily, these masses are crumbled to a granular form, which is then commonly used as abrasive or is rebonded by known techniques (not involving complete melting and solidification as a monolithic body or casting) to form hard and highly refractory bodies for a variety of high temperature and/or wear resistance applications as is well known in the art. In some cases, prior friable masses of the metal borides or of the metal carbides have been produced with a small excess of carbon in the raw materials forming a minor but undesired contaminating amount of free carbon in these masses—amounting to fractions up to 1–1½% by weight in the borides and somewhat greater (e.g. more commonly 1–2% by weight) in the carbides. Most efforts were made to eliminate such free carbon contaminant in the granular materials because it caused difficulties in producing proper abrasive or wear resistant products, or the free carbon was further reacted with a carbide-forming element to convert the carbon to a hard carbide. However, prior to our invention as described herein, to our knowledge, no one has formed monolithic bodies or castings of fused cast refractory solidified from the completely molten state and consisting essentially of a substantial amount (i.e. at least 7% or even as low as 2% by weight) of free carbon (graphite) in the form of an intergrown network intermingling and interlocking with substantially randomly oriented crystals of metallic boride and/or of metallic borocarbide. Nor to our knowledge, as a result, have they recognized the great technological benefits to be gained thereby, particularly the superior resistance to thermal shock in addition to, in most cases, elevated temperature oxidation resistance and/or excellent resistance to corrosion and erosion by molten metal and slags as noted above.

Modern day technology continues increasingly to create greater demand for materials that will withstand high and suddenly applied temperatures, from a standpoint of both thermal shock failure and oxidation. We have now discovered monolithic bodies or castings of fused cast refractory having a novel combination of composition and structure substantially uniform throughout that will help meet this continuing demand. Hence, it is one of the principal objects of this invention to provide highly refractory monolithic bodies or castings of such fused cast refractory possessing thermal shock resistance superior to that of any fused cast refractory articles commercially produced heretofore to our knowledge. It is also an object of this invention to provide such fused cast refractory additionally having excellent resistance to oxidation at temperatures up to about 1000° C. or more.

Although the commercial popularity of the basic oxygen steelmaking processes continues to grow, the problem of relatively rapid consumption of refractory material making up the linings in these basic oxygen furnaces or vessels continues to seriously hinder the much desired greater economy of operation and greater output. We have also now discovered that this problem can be very materially reduced by providing, and constructing the basic oxygen and vessel linings of, the novel fused cast refractory monolithic articles or bodies according to the present invention which possess a resistance to the corrosive and erosive effects of molten ferrous metal and ferruginous slag in these processes greatly superior to that of the refractory products more commonly used heretofore for these linings. Accordingly, it is another principal object of this invention to provide these novel fused cast refractory products having such improved properties for use in making up the linings of basic oxygen furnaces or vessels. These fused cast refractory bodies of this invention are particularly suitable for forming the working lining of the basic oxygen vessels that conventionally comprise a generally pear-shaped or barrel-shaped metal tank or casing, insulating refractory lining covering the internal surfaces of this tank, working refractory lining covering the internal surfaces of the insulating refractory lining and a water-cooled lance or means for providing an oxygen blast directed into the refractory lined tank.

The present invention is an article of manufacture that can be generally defined as a fused cast refractory body consisting essentially of at least 7% (or at a very minimum of 2%) by weight free carbon in the form of an intergrown network intermingling and interlocking with substantially randomly oriented crystals including crystals selected from the group consisting of metallic boride crystals, metallic borocarbide crystals (i.e. a complex phase of metal-boron-carbon that might also be described as either metallic carbide containing boron in solid solution or metallic boride containing carbon in solid solution, and may alternatively be termed carboboride) and mixtures of these crystals, and the body analytically comprises essentially carbon, more than 5% (desirably at least 10% to assure good oxidation resistance) by weight of boron and more than 5% (desirably at least 10%) by weight of metallic substance as set forth below. While these are the only two or three essential phases and the only three essential analytical components of the monolithic body, limited amounts of other optional phases and/or analytical components (as specified below) may be included as desired and without deleteriously affecting the basic novel properties indicated above. Inclusion of these optional phases and/or analytical components will usually depend upon the precise properties desired in the final product, the processing conditions desirably employed and the raw materials that are desired to be used.

The analytical metallic substance can be composed of one or more metallic elements now to be described. Where only a single metallic element is employed to form the crystals of boride and/or borocarbide, this element is selected from the group consisting of titanium, zirconium, hafnium, vanadium, niobium, tantalum, chromium, molybdenum, tungsten and silicon. Any mixture of two or more of the foregoing metals can also be employed to form one or more physical constituents or phases of metallic boride, of metallic borocarbide and of mixtures thereof, depending upon the degree of mutual solid solution solubility of one such boride or carbide in other borides or carbides. Also, the analytical metallic substance may be composed of mixtures comprising any one or more of the above-described first group of metals plus at least one metallic element selected from a second group consisting of manganese, iron, cobalt and nickel provided the content of the second group metals is not greater than 50% by weight of the total metallic substance content. In the case of the latter mixtures, one or more boride and/or borocarbide phases will also be formed depending upon the degree of mutual solid solution solubility.

The optional analytical components permissible in the fused cast refractory according to this invention may be categorized as diluents and/or impurities. Oxygen and nitrogen are here categorized as diluents, although in some cases they may be in a sense deemed impurities while in other cases they may be deemed desirable additives. Each of oxygen and nitrogen should not analytically exceed 10% by weight of the monolithic body or casting and the total sum of oxygen plus nitrogen should not analytically exceed 15% by weight of the body or casting in order to avoid deleteriously affecting the basic novel properties, such as the thermal shock resistance and the corrosion-erosion resistance. It may also contain analytically, as a remainder, other elements up to 10% (preferably not more than 5%) by weight as impurities or minor diluent additives. Many of such other elements will commonly result from the use of less pure raw materials and may include (although not limited thereto) elements such as aluminum, alkali metals, alkaline earth metals, rare earth metals, sulfur, phosphorus, etc. Again the limitation on the remainder of these other elements is generally necessary to avoid deleteriously affecting one or more of the basic novel properties.

Within the scope of this invention, several different combinations of physical constituents or phases are obtained while providing the basic novel properties in all cases observed. As mentioned above, free carbon (or graphite) is one of the essential constituents or phases in all cases in an amount of at least 7% by weight or at a very minimum 2% by weight. This free carbon intermingling and interlocking with the remaining mass of crystals is believed to be particularly and critically important to obtaining the highly superior thermal shock resistance. Also, it has been observed that all the bodies having the basic novel properties according to this invention contained as a principal constituent or phase either metal boride crystals or metal borocarbide crystals or a mixture of these two types of crystals. However, a number of variants of these boride and borocarbide crystals were noted with variations in analytical composition. Among the variants found are: one or more of simple borides, e.g. $TiB_2$ or $Cr_3B_2+CrB$; one or more of complex borides comprising in essence a solid solution of two or more simple borides, e.g. $(Ti,Cr)B_2$; one or more of simple borocarbides, e.g. $Cr(B_xC_y)$; one or more of complex borocarbides comprising in essence a solid solution of two or more simple borocarbides, e.g. $(Zr,Hf)(B_xC_y)$; or mixtures of these four variants. Particularly in those composition systems involving three or more of the metallic substances, the existence of very complex crystalline phases and/or solid solutions are possible and usually likely. Moreover, additional crystal phases were found in a number of samples, which included boron carbide, metallic carbides and (to a lesser degree) elemental metal or alloy, metallic oxides and/or complex phases containing carbon, oxygen and nitrogen.

In connection with the further detailed description of this invention, reference will be made to the accompanying drawings in which FIGURES 1 through 8 are photomicrographs (magnification approx. 120×) showing exemplary microstructures of eight different embodiments or fused cast refractory examples according to this invention.

In carrying out this invention, the raw materials (preferably premixed) can be a mixture of: (1) the appropriate metal (or metals) and/or oxide of the appropriate metal (or metals) plus (2) boron, boric oxide and/or borate, (3) with or without (for the reasons set forth below) a source of carbon (e.g. carbon black, graphite, coke, etc.). Of course, any other suitable raw material mixtures desired can also be employed, e.g. boride and graphite. The mixtures can be readily melted, without excessive loss of material by sublimation and/or vaporization, in either an electric induction melting furnace employing a graphite lining or pot, or in a conventioal electric arc melting furnace employing graphite electrodes in the same manner as is common in producing other fused cast type refractories or in producing calcium carbide. In the case of the arc melting furnace, the lining of the furnace shell need not be specially constructed of graphite because the melting operation can be carried out in the customary manner of forming a molten pool contained within a surrounding mass of unmelted and unreacted and/or partially reacted batch mixture material as a protective liner to prevent contamination of the molten bath. In order to avoid excessive oxidation of the charge by the ambient air, appropriate measures should be taken to maintain a neural or reducing atmosphere in contact with the top exposed surfaces of the charge. For example, an appropriate loose fitting crown or cover over the top opening of the furnace can be employed to regulate the exhaust of the reducing gases and fume produced during the melting operation so as to substantially prevent ingress of air into the furnace chamber.

The molten product in the furnace obtains or derives a substantial amount of its carbon content from the graphite liner or the graphite electrodes (as the case may be) and, therefore, the amount of carbon employed in the batch mixture is kept less than the total amount of carbon necessary to form the particular composition desired. In some cases, no carbon need be employed in the batch mixture as the necessary amount of carbon can be wholly obtained or derived from the graphite liner or graphite electrodes. No precise rule of proportioning can be specified as the amount of carbon from either source will vary depending upon such common variable process factors as time, temperature, rate of power input, etc., which factors usually vary with each furnace and furnace operator. In any event, the appropriate proportioning can be readily determined by those skilled in this art by minimal trial experience.

In accordance with a desired practice, an appropriate quantity of molten batch material is formed and then the molten mass is quickly poured into graphite molds, which molds are provided with the usual font header and surrounded in the conventional manner with annealing powder, such as alumina powder, powdered coke, etc. The top of the font header is also covered with annealing powder and the cast molten material is allowed to solidify therein to form a monolithic casting or body of fused cast refractory having the shape of the mold cavity. This procedure produces relatively rapid solidification yielding substantially random shaped boride and/or borocarbide (with or without carbides and minor amounts of oxides and/or oxyborides) crystals or crystalline masses that are substantially (i.e. at the very least 40% by weight of the crystals) randomly oriented and that are of relatively medium-to-fine grain size. The free carbon (which in most cases is crystalline graphite) forms an intergrown network intermingling and interlocking with the boride, borocarbide and other crystals or crystal masses. Such a network is in essence most of, or at least the great majority of, the numerous particles, masses or crystals of free carbon (graphite) in the body grown or bonded together (commonly at intersecting points) to form a skeleton of at least semicontinuous nature. This free carbon network or skeleton may be made up of a variety of irregular shaped masses, many of which appear as elongated segments and all of which intermingle within and between the other crystals and crystal masses. In some cases, larger platelets of graphite additionally appear and form part of the network or skeleton. Together with smaller elongated segments in some cases, these platelets form a random, semicontinuous interwoven pattern or intertexture within and between the mass of other crystals.

The interlocking nature of the bonding between the free carbon network or skeleton and the crystals or crystal masses of boride, borocarbide and other crystals is evidence by irregular but tightly formed boundaries between them. Such irregular boundaries may appear as portions of one crystal or mass seemingly protruding or bulging into portions of adjacent crystals or masses. Moreover, the irregularity of such boundaries may be so severe that the free carbon appears to interfinger the other crystals with extended as well as crooked projections, which may be such as to give the appearance of a sutured boundary.

The interlocking bonding in combination with the intergrown network of free carbon (graphite) is typical only of fused cast refractory (in contrast to pressed and sintered mixtures, including such sintered mixtures that are fired high enough to fuse only the crystalline boride, borocarbide and/or other phases having melting points lower than the free carbon or graphite so as to form a partial network or coating of these lower melting phases around separated grains of carbon or graphite). This typically fused cast structure provides extremely tight bonding of all the phases that are not easily opened up at the boundaries, which is important for good corrosion resistance to gases and liquids put in contact with the refractory body. It also imparts good resistance to abrasion and/or erosion by gases, liquids and/or solids. Plucking or washing away grains or particles of the body by such contacting substances as molten slags is avoided or minimized to a great degree because the structure is held together by the higher melting point phase of free carbon or graphite network that separates much of the lower melting crystalline phases, which are more subject to melting, dissolving or corroding action. More corrosive liquid penetration is much more difficult and slow along the irregular (interlocking) boundaries than the smoother or more regular boundaries as are commonly found in pressed and sintered bodies.

Figure 2:
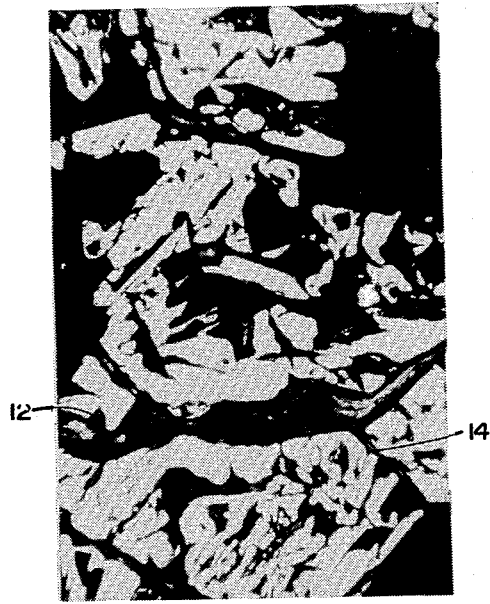
Figure 3:
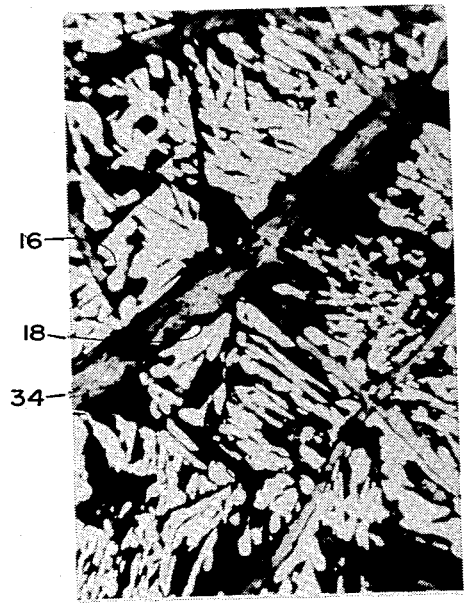
Figure 4:
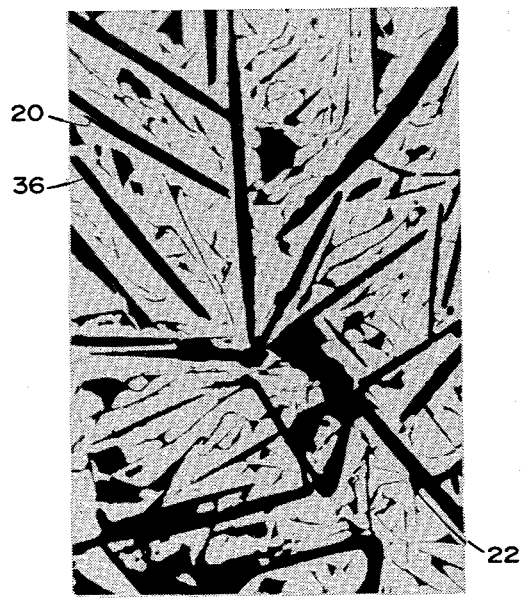
Figure 5:
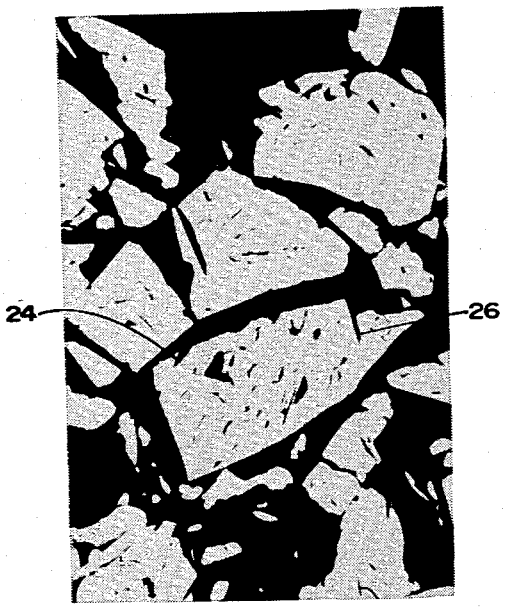
Figure 6:
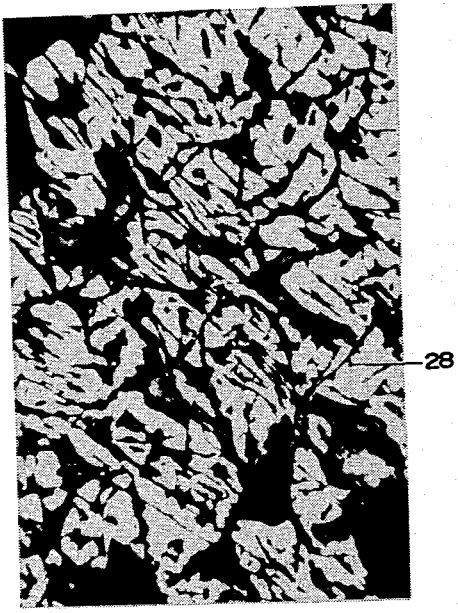
Figure 7:
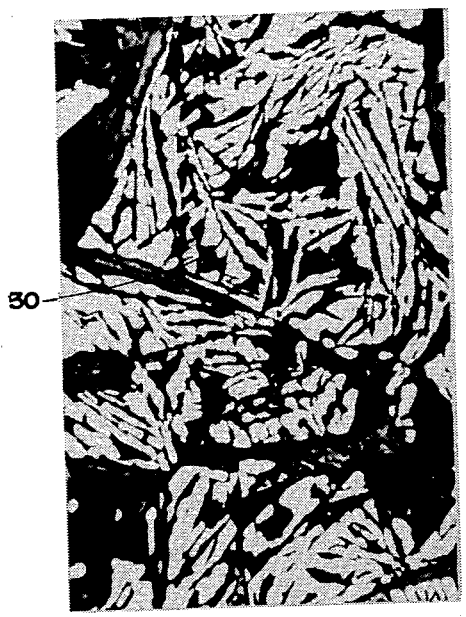
Figure 8:
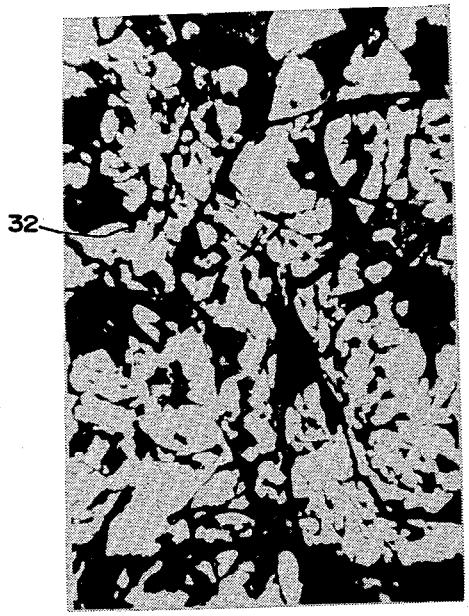

The microstructures of bodies according to this invention will be better understood by reference to the accompanying drawings. The illustrated exemplary microstructures are of certain examples set forth in the table below as follows: FIGURE 1, Example No. 3; FIGURE 2, Example No. 10; FIGURE 3, Example No. 13; FIGURE 4, Example No. 31; FIGURE 5, Example No. 34; FIGURE 6, Example No. 37; FIGURE 7, Example No. 42; and FIGURE 8, Example No. 54. The light or white areas are the randomly shaped and oriented boride, borocarbide, etc., crystals. The dark gray and/or black areas are the intergrown network of free carbon or graphite. Irregular boundaries and interfingering between the light and dark areas is readily apparent in all the figures. For example, see 10 in FIGURE 1, 12 and 14 in FIGURE 2, 16 and 18 in FIGURE 3, 20 and 22 in FIGURE 4, 24 and 26 in FIGURE 5, 28 in FIGURE 6, 30 in FIGURE 7 (especially illustrative of sutured boundary) and 32 in FIGURE 8. Within the fields of FIGURES 3 and 4 can be seen typical illustrations of the larger graphite platelets 34 and 36. Some of the smaller or finer elongated dark areas (for example see 38 in FIGURE 5 and 40 in FIGURE 7) appear to be part of a eutectic structure or possibly exsolved (precipitated) graphite within the boride, borocarbide, etc., crystals. Moreover, sometimes the smaller graphite areas tend to be dendritic in shape. Although not readily evident in the limited field shown in each figure, direct bonding between the boride, borocarbide, etc., crystals is also observed in addition to graphite-to-graphite bonding and bonding between the graphite and the other crystals shown in the figures.

By way of illustration and providing a better understanding of this invention, a series of examples are given in the table together with data pointing up the unique characteristics of the invention. All these examples except Nos. 17, 22 and 51 were produced by melting in an induction furnace having a graphite pot. The remaining three examples were produced by melting in an electric arc melting furnace employing graphite electrodes.

TABLE

| No. | Batch Mixture* Composition | Chemical* Analysis | Phase* Analysis | T.S. Cycles | O.R.† | Percent Slag Cut | Percent Fe Cut |
|---|---|---|---|---|---|---|---|
| 1 | 81.5% Ti, 18.5% B | 50% Ti, 11% B, 39% C | 37% $TiB_2$, 31% TiC, 32% G | | Good | 9 | 2(I) |
| 2 | 75% Ti, 25% B | 52.9% Ti, 11.6% B, 35.5% C | 36.8% $TiB_2$, 22.7% TiC, 40.4% G | | do | 8 | 8(I) |
| 3 | 70% Ti, 30% B | 37% Ti, 10% B, 53% C | 33% $TiB_2$, 18% TiC, 49% G | >8 | do | | 10(I) |
| 4 | 65% Ti, 35% B | 39.3% Ti, 15.0% B, 45.7% C | 48.2% $TiB_2$, 7.6% TiC, 44.2% G | | Fair | 41 | |
| 5 | 60% Ti, 40% B | 46% Ti, 21% B, 33% C | 67% $TiB_2$, 33% G | | | | 36 |
| 6 | 50% Ti, 50% B | 43.3% Ti, 22.01% B, 34.7% C | $TiB_2$, $B_4C$, TiC, >20% G | | | 31 | 13(I) |
| 7 | 73.3% Ti, 16.7% B, 10% C | 39% Ti, 9% B, 52% C | 29% $TiB_2$, 24% TiC, 47% G | | Good | | 28(I) |
| 8 | 63% Ti, 27% B, 10% C | 49% Ti, 14% B, 37% C | 46% $TiB_2$, 21% TiC, 33% G | | do | | 3(I) |
| 9 | 14% Ti, 68.4% B, 17.6% C | 12% Ti, 47% B, 41% C | 53% $B_4C$, 17% $TiB_2$, 30% G | >8 | Exc | | 6(I) |
| 10 | 49% Ti, 21% B, 30% C | 48% Ti, 13% B, 39% C | 41% $TiB_2$, 25% TiC, 35% G | 8 | Fair | | 38(I) |
| 11 | 40.7% Ti, 9.3% B, 50% C | 57% Ti, 9% B, 34% C | 46% $TiB_2$, 30% TiC, 24% G | | | | 2(I) |
| 12 | 39% Ti, 15% B, 50% C | 26% Ti, 5.5% B, 68.5% C | 18% TiC, 17% $TiB_2$, 65% G | | Poor | | 1(I) |
| 13 | 66.5% Ti, 5% $TiO_2$, 28.5% B | 54% Ti, 17% B, 29% C | 56% $TiB_2$, 20% TiC, 24% G | 3 | Good | 15 | |
| 14 | 63% Ti, 10% $TiO_2$, 27% B | 33% Ti, 12% B, 55% C | 37% $TiB_2$, 10% TiC, 53% G | | Good | | 34(I) |
| 15 | 56% Ti, 20% $TiO_2$, 24% B | 54% Ti, 10% B, 36% C | 41% TiC, 31% $TiB_2$, 28% G | 5 | Good | | 0(I) |
| 16 | 56% Ti, 20% TiN, 24% B | 39% Ti, 9% B, 52% C | 29% $TiB_2$, 24% TiC, 47% G | | | | |
| 17 | 55% $TiO_2$, 20% $B_2O_3$, 25% C | 73% Ti, 11% B, 10% C, 3% O, 3% N | 62% Ti (C, O, N) 36% $TiB_2$, 2% G | | | | 17(R) |
| 18 | 80% Zr, 20% B | 49.2% Zr, 9.8% B, 40.9% C | 51.2% $ZrB_2$, 8.8% ZrC, 39.9% G | >8 | Very good | 27 | 2(I) |
| 19 | 72% Zr, 18% B, 10% C | 68.7% Zr, 8.4% B, 22.9% C | $ZrB_2$, ZrC, >15% G | | do | 40 | |
| 20 | 64% Zr, 16% B, 20% C | 46.1% Zr, 9.9% B, 44.0% C | 51.8% $ZrB_2$, 4.8% ZrC, 43.4% G | | do | 32 | |
| 21 | 48% Zr, 12% B, 40% C | 64.2% Zr, 5.9% B, 29.9% C | $ZrB_2$, ZrC >20% G | | | 19 | |
| 22 | 35% $ZrO_2$, 35% $B_2O_3$, 30% C | 74% Zr, 19% B, 7% C | 92% $ZrB_2$, 2% $B_4C$, 6% G | | | | |
| 23 | 76.8% Zr, 19.2% B, 4% Al | 54% Zr, 7% B, 36% C, 3% other | 39% $ZrB_2$, 25% ZrC, 32% G, 3% other | | | | |

TABLE—Continued

| No. | Batch Mixture* Composition | Chemical* Analysis | Phase* Analysis | T.S. Cycles | O.R.† | Percent Slag Cut | Percent Fe Cut |
|---|---|---|---|---|---|---|---|
| 24 | 59.7% HfO₂, 16.8% B, 23.5% C | 55% Hf, 17% B, 28% C | 62% HfB₂, 14% B₄C, 24% G | | | | |
| 25 | 55.5% Nb₂O₅, 17.6% B, 26.9% C | 55% Nb, 22% B, 23% C | 67% NbB₂, 12% B₄C, 21% G | | | 22 | 9(I) |
| 26 | 35% Nb₂O₅, 25% B, 40% C | 33% Nb, 18% B, 49% C | 41% NbB₂, 13% B₄C, 46% G | | | | |
| 27 | 67% Ta₂O₅, 11.8% B, 21.2% C | 62% Ta, 14% B, 24% C | 70% TaB₂, 8% B₄C, 22% G | | | | |
| 28 | 42.2% Ta₂O₅, 25.9% B, 31.9% C | 56% Ta, 17% B, 27% C | 62% TaB₂, 14% B₄C, 24% G | | | | |
| 29 | 66.7% Cr₂O₃, 10% B, 23.3% C | 53% Cr, 11% B, 36% C | 65% CrB, 35% G | | | <50 | |
| 30 | 44.4% Cr₂O₃, 27.3% B, 28.3% C | 32% Cr, 23% B, 45% C | 45% CrB₂, 12% B₄C, 43% G | | | | |
| 31 | 82% Mo, 18% B | 69% Mo, 17% B, 14% C | 54% MoB₂, 32% Mo₂B₅, 14% G | | Exc | | |
| 32 | 40% Mo, 30% B, 30% C | 36% Mo, 21% B, 43% C | 23% MoB₂, 22% Mo₂B₅, 15% B₄C, 40% G | | | | |
| 33 | 94% W, 6% B | 90% W, 6% B, 4% C | 86% α WB, 10% W₂B₅, 4% G | | Exc | 100 | |
| 34 | 89% W, 11% B | 86% W, 11% B, 3% C | 83% WB (or W₂B₅), 14% W₂C, 3% G | | Exc | | |
| 35 | 60% W, 20% B, 20% C | 49% W, 13% B, 38% C | 29% α WC, 25% W₂B₅, 12% B₄C, 35% G | | | 100 | 21(I) |
| 36 | 69.3% Ti, 1% Zr, 29.7% B | 49% Ti, 15% B, 36% C | 50% TiB₂, 18% TiC, 32% G | | Good | | 3(I) |
| 37 | 67.9% Ti, 3% Zr, 29.1% B | 47% Ti, 3% Zr, 12% B, 38% C | 39% TiB₂, 25% TiC, 4% ZrC, 32% G | | Good | | 14(I) |
| 38 | 49% Ti, 10% Zr, 15% B, 21% C, 5% Si | 31% Ti, 8% Zr, 2% Si, 7% B, 52% C | 22% TiB₂, 20% TiC, 9% ZrC, 2% SiC, 47% G | 3 | Poor | | 26(I) |
| 39 | 15% Ti, 20% Zr, 20% B, 45% C | 9% Ti, 20% Zr, 6% B, 65% C | 22% (Zr,Ti)B₂, 18% (Zr,Ti)C, 60% G | | | | |
| 40 | 20% TiO₂, 64% Zr, 16% B | 5% Ti, 53% Zr, 7% B, 35% C | 35% ZrC, 34% (Zr,Ti)B₂, 31% G | | Poor | | |
| 41 | 57% Ti, 5% Cr, 38% B | 38% Ti, 2% Cr, 18% B, 42% C | 56% TiB₂, 2% CrB, 42% G | | | | |
| 42 | 51% Ti, 15% Cr, 34% B | 22% Ti, 7% Cr, 15% B, 56% C | 41% (Ti,Cr)B₂, 3% B, 56% G | >8 | | 47 | 0(I) |
| 43 | 41% Ti, 30% Cr, 28% B | 32% Ti, 15% Cr, 17% B, 36% C | 46% TiB₂, 18% CrB, 36% G | | | | |
| 44 | 25% Ti, 10% Cr, 20% B, 45% C | 16% Ti, 6% Cr, 10% B, 68% C | 23% TiB₂, 7% Cr₃C₂, 3% B₄C, 67% G | | | | |
| 45 | 8% Ti, 4.4% Cr, 67.2% B, 20.4% C | 3.5% Ti, 1.5% Cr, 19% B, 76% C | 10% (TiCr)B₂, 21% B₄C, 69% G | | Exc | >50 | 5(I) |
| 46 | 25% Ti, 10% Si, 20% B, 45% C | 15% Ti, 10% Si, 10% B, 65% C | 17% TiB₂, 15% SiC, 6% B₄C, 4% TiC, 58% G | | | | |
| 47 | 67.9% Ti, 3% Mn, 29.1% B | 44% Ti, 17% B, 39% C | 55% TiB₂, 7% TiC, 38% G | | | | |
| 48 | 67.9% Ti, 3% Fe, 29.1% B | 37% Ti, 14% B, 49% C | 44% TiB₂, 8% TiC, 48% G | | Very good | | |
| 49 | 30% Ti, 10% Fe, 20% B, 40% C | 23% Ti, 9% Fe, 10% B, 58% C | 26% TiB₂, 9% FeₓCᵧ, 5% TiC, 3% B₄C, 57% G | | Good | | |
| 50 | 60% FeTiO₃, 10% B, 30% C | 46% Ti, 3% Fe, 14% B, 37% C | 47% (Ti,Fe)B₂, 21% TiC, 32% G | 4 | | 14 | |
| 51 | 20% FeTiO₃, 55% B₂O₃, 25% C | 53% Ti, 8% Fe, 29% B, 10% C | 86% (Ti,Fe)B₂, 3% FeB, 3% B₄C, 8% G | | | | |
| 52 | 19.1% Zr, 16.9% HfO₂, 19.1% B, 44.9% C | 30% Zr, 25% Hf, 13% B, 32% C | 66% (Zr,Hf)B₂, 3% B₄C, 31% G | | | | |
| 53 | 19% Zr, 17.4% Ta₂O₅, 19% B, 44.6% C | 26% Zr, 18% Ta, 18% B, 38% C | 29% (Zr,Ta)B₂, 24% (Ta,Zr)B₂, 13% B₄C, 34% G | | | | |
| 54 | 72% Zr, 10% Cr, 18% B | 64% Zr, 4% Cr, 12% B, 19% C | 57% ZrB₂, 21% ZrC, 6% CrB, 16% G | | Very good | 27 | 0(I) |
| 55 | 64% Zr, 20% Cr, 16% B | 66% Zr, 9% Cr, 13% B, 12% C | 56% ZrB₂, 25% ZrC, 11% CrB, 8% G | | do | 42 | 1(I) |
| 56 | 56% Zr, 30% Cr, 14% B | 64% Zr, 14% Cr, 10% B, 12% C | 38% ZrB₂, 38% ZrC, 16% CrB, 8% G | 5 | Good | | |
| 57 | 48% Zr, 40% Cr, 12% B | 62% Zr, 14% Cr, 7% B, 17% C | 50% ZrC, 22% ZrB₂, 17% CrB, 11% G | | Poor | 35 | 4(I) |
| 58 | 40% Zr, 50% Cr, 10% B | 59% Zr, 18% Cr, 10% B, 13% C | 36% ZrC, 33% ZrB₂, 22% CrB, 9% G | | Good | 52 | 0(I) |
| 59 | 25% Zr, 10% Si, 20% B, 45% C | 31% Zr, 14% Si, 7% B, 48% C | 38% ZrB₂, 20% SiC, 42% G | | | | |
| 60 | 40% ZrSiO₄, 20% B₂O₃, 40% C | 31% Zr, 11% Si, 6% B, 52% C | 29% ZrB₂, 15% SiC, 11% ZrC, 45% G | | | | |
| 61 | 37.5% ZrSiO₄, 37.5% B₂O₃, 25% C | 45% Zr, 12% Si, 11% B, 32% C | 56% ZrB₂, 17% SiC, 27% G | | | | |
| 62 | 21.1% HfO₂, 16.3% Ta₂O₅, 17.8% B, 44.8% C | 24% Hf, 18% Ta, 16% B, 42% C | 47% (Ta,Hf)B₂, 13% B₄C, 39% G | | | | |
| 63 | 9.2% V, 27.8% Ta₂O₅, 18.2% B, 44.8% C | 2% V, 42% Ta, 15% B, 41% C | 49% (Ta,V)B₂, 13% B₄C, 38% G | | | | |
| 64 | 23.7% Nb₂O₅, 15.1% Ta₂O₅, 20.7% B, 40.5% C | 21% Nb, 18% Ta, 17% B, 44% C | 46% (Nb,Ta)B₂, 13% B₄C, 41% G | | | | |
| 65 | 27.8% Ta₂O₅, 9.1% W, 22.8% B, 40.3% C | 35% Ta, 12% W, 14% B, 39% C | 43% (Ta,W)B₂, 11% B₄C, 9% (W,Ta)₂B₅, 37% G | | | | |
| 66 | 20% Mo, 15% W, 20% B, 45% C | 24% Mo, 18% W, 19% B, 39% C | 41% (Mo,W)₂B₅, 13% B₄C, 10% MoB₂, 36% G | | | | |
| 67 | 25% Ti, 5% Cr, 5% Fe, 20% B, 45% C | 25% Ti, 5% Cr, 4% Fe, 8% B, 58% C | 25% TiB₂, 9% (Ti,Cr)C, 9% (Fe,Cr)ₓCᵧ, 57% G | | | | |
| 68 | 49% Ti, 10% Si, 10% Fe, 10% B, 21% C | 35% Ti, 8% Si, 9% Fe, 5% B, 43% C | 29% TiC, 16% TiB₂, 12% SiC, 9% FeₓCᵧ, 34% G | 2 | Exc | | |
| 69 | 23.3% Nb₂O₅, 19.9% Ta₂O₅, 8.1% Fe, 8.1% B, 40.6% C | 28% Nb, 29% Ta, 6% Fe, 11% B, 26% C | 67% (Nb,Ta)B₂, 7% FeB, 26% G | | | | |
| 70 | 18.3% Nb₂O₅, 15.6% Ta₂O₅, 4.3% Fe, 17.1% B, 44.7% C | 22% Nb, 23% Ta, 7% Fe, 19% B, 29% C | 53% (Ta,Nb)B₂, 13% B₄C, 8% FeB, 26% G | | | | |
| 71 | 10% Ti, 20% V, 5% Cr, 5% 20% B, 40% C | 20% Ti, 6% V, 3% Cr, 4% Fe, 7% B, 60% C | 24% TiB₂ss, 8% TiCss, 7% VC, 5% ΣFe₂C, 56% G | | | | |

*In percent by weight. †Exc. means excellent.

In preparing the comminuted batch mixtures for the examples in the table, commercial carbon black was employed in those examples where carbon (C) is indicated to be part of the batch mixture. Of course, the final fused cast product acquires carbon in addition to this batch carbon from the graphite crucible (pot) or the graphite electrodes, respectively. Other raw materials used in the comminuted batch mixtures and typical chemical analyses (in weight percent) of such materials are as follows:

B (commercially pure boron):
  91% net boron, 0.3% water soluble boron, 4.2% magnesium, 0.3% $H_2O_2$ insolubles, 0.25% moisture.

$B_2O_3$ (high purity boric anhydride):
  99+% $B_2O_3$.

Ti (titanium sponge):
  99.3% Ti, 0.40% max. Mg, 0.1% max. Fe, 0.15% max. Cl.

$TiO_2$ (rutile):
  96–98% $TiO_2$, 1% max. $Fe_2O_3$, 0.3% $ZrO_2$, 0.3% $Al_2O_3$, 0.25% $SiO_2$, 0.1% $Cr_2O_3$, 0.29% $V_2O_5$, 0.025–0.05% $P_2O_5$, 0.1% S.

TiN (titanium nitride):
    99+% TiN.
Al (commercially pure aluminum):
    99+% Al.
Zr (zirconium sponge):
    99.2% min. Zr+Hf (Hf approx. 2%), 0.2% max. Cr+Fe.
$ZrO_2$ (zirconia):
    94.15% $ZrO_2$, 2.00% $HfO_2$, 1.00% max. $Al_2O_3$, 0.8% max. $SiO_2$, 0.75% max. CaO, 0.50% max. $Fe_2O_3$.
$HfO_2$:
    97+% $HfO_2$ (Zr approx. 2%).
V (high purity metal):
    99+% V.
$Nb_2O_5$ (optical grade):
    99.9+% $Nb_2O_5$.
$Ta_2O_5$ (optical grade):
    99.9+% $Ta_2O_5$.
Cr (high purity metal):
    99.80% Cr min., 0.20% Fe max.
$Cr_2O_3$ (green chromic oxide):
    99.75+% $Cr_2O_3$.
Mo (high purity metal):
    99+% Mo.
W (high purity metal):
    99+% W.
Mn (intermediate iron-ferromanganese):
    80–88% Mn, 0.7–1.5% C, 0.35–0.5% Si, balance Fe.
Fe (pure metal):
    99+% Fe.
$FeTiO_3$ (ilmenite):
    63.14% $TiO_2$, 31.7% $Fe_2O_3$, 0.5% $Al_2O_3$, 0.4% MgO, 0.3% $SiO_2$, 0.12% $Cr_2O_3$.

The phase anlysis data were obtained from samples by the conventional techniques, such as the point count method or X-ray diffraction patterns and microscopic examinations. The free carbon was found in these examples to be present as crystalline graphite (G).

The highly superior thermal shock resistance data (T.S.) are based on a severe test that involved cutting an approximately 1" x ¾" x ½" sample from each example, heating the sample to 1800° C. and then dropping the hot sample into water at room temperature. This procedure constitutes one cycle of this severe test. At the end of each cycle, the sample is examined for the occurrence of one or more thermal shock fractures. If none are found, the cycle is repeated until such fracturing is observed and the total number of cycles completed at that time are noted. However, no sample was subjected to more than eight cycles for economy purposes since no fracturing at the end of eight cycles in this test, is without doubt, indicative of highly superior thermal shock resistance. The samples that showed no fracturing at the end of eight cycles are noted as >8 cycles.

In contrast to the present invention, an identical sized sample of the commercial fused cast refractory that, to our knowledge, exhibited the highest degree of thermal shock resistance heretofore shattered into about three pieces on the second cycle in the above-described test. Such commercial refractory is a fused and cast mixture of, by weight, 98.81% alumina, 0.52% quicklime and 0.67% fluorspar. Another fused cast refractory that had previously been found to have relatively good thermal shock resistance is that of fused cast pure magnesium oxide casting having a crystalline texture consisting of at least 75 volume percent of equant, unoriented, periclase crystals with a majority of these crystals having a fine-to-medium grain size ranging from 20 to 5000 microns. Identical sized samples of these magnesia castings shattered into two or three pieces on the first or second cycle of the same test.

Oxidation resistance (O.R.) was determined by heating samples for 16 hours at 1000° C., thereafter cooling them to room temperature and X-raying them to determine the presence of oxide phase in quantity greater than in the original sample before testing. Substantially no increase in oxide phase content was indicative of excellent oxidation resistance while a very minor amount of increased oxide (e.g. $TiO_2$, $ZrO_2$, etc.) was denoted as very good resistance, and ratings of good, fair and poor were indicative of increasing greater amounts of increased oxide up to predominant quantities thereof for a poor rating. The high degree of oxidation resistance appears to be at least partly the result of a thin, boron oxide-rich, glassy film forming on the external surfaces of the body, which film retards further oxidation of the body. From such testing, it was noted that an amount of at least 10% by weight boron was necessary to consistently assure good oxidation resistance.

In order to demonstrate the improved slag resistance possible with this invention under reducing atmosphere conditions of basic oxygen steelmaking processes, the following test was conducted for examples of this invention as well as of prior art materials, two of which are more commonly used for basic oxygen furnace linings. The test comprised placing 1½" x 1" x ½" samples in a gas-oxygen furnace adapted to approximate the temperature and reducing atmosphere of a basic oxygen furnace. At 1700° C. for 2½ to 3 hours, the samples were passed, with one of their largest surfaces facing upward, through a downwardly directed stream of molten high-lime basic ferruginous slag droplets at a substantially uniform rate of 60 times per hour until 2 kilograms of slag had been employed. The slag was representative of basic oxygen furnace slag developed during the production of a heat of steel and had the following composition, by weight: 23.75% $Fe_2O_3$, 25.94% $SiO_2$, 40.86% CaO, 6.25% MgO and 3.20% $Al_2O_3$. At the end of the test, the average thickness of the samples was measured and compared with the original ½" thickness. The results are expressed as a percentage change in thickness (called percent slag cut).

In contrast to the present invention, two samples of more conventional tar bonded dolomite brick both exhibited a slag cut of 100% (i.e. these samples were completely cut in half) in the same test. Samples of common commercial fused cast basic refractory made from a mixture of essentially 55% by weight magnesite and 45% by weight chrome ore exhibited slag cuts of 50–100%. The refractory castings of this invention compare favorably with another recently developed fused cast basic refractory for basic oxygen furnace linings. This latter refractory is a fused and cast mixture of 90% by weight magnesite and 10% by weight rutile, and it exhibits a slag cut of 25–30% in the above-described test. It is also interesting to note the comparison of graphite (electrode grade) in the same test. A series of 14 samples of the graphite exhibited slag cuts of 20–46%.

The refractory product of this invention has also exhibited good resistance to attack by molten iron as demonstrated by the results of two tests utilizing the same size of sample as employed in the above-described slag resistance test and the percent Fe cut is determined in the same manner as the percent slag cut.

One test was of a static nature and involved merely immersing the sample in molten iron at 1750° C. and holding it there for ½ hour. Then the sample and the molten iron were cooled to room temperature and the percent Fe cut determined. The results of this test are noted in the table by the symbol (I) immediately following the values of percent Fe cut.

The other molten iron test was identical to the slag resistance test noted above except that the test was conducted at 1600° C. with the samples passed through a downwardly directed stream of molten iron instead of molten slag. The results of this test are noted in the table by the symbol (R) immediately following the values of percent Fe cut.

In the latter molten iron test, the aforementioned comercial fused cast refractory of 55% magnesite and 45% chrome ore exhibited and Fe cut of 45%, the aforementioned fused cast refractory of 90% magnesite and 10% rutile exhibited a 22% Fe cut, and a graphite (electrode grade) sample exhibited a 35% Fe cut.

While the monolithic bodies of fused cast refractory according to this invention broadly require that each of the boron and the total metallic substance (as described above) be at least more than 5% by weight, certain minimum analytical limits of a more restricted nature for the individual metals and for the boron combined therewith have been determined to be desirable in order to assure that the combination of improved properties noted above are obtained. These restricted minimum analytical limits for when the metals are used alone or in certain combinations are as follows (by weight):

| Metallic Substance | Substance Minimum | Boron Minimum |
| --- | --- | --- |
| Only one metal selected from the group: Ti, Zr, Hf, V, Nb, Ta, Cr, Mo, W | 10 | 10 |
| Silicon alone | >5 | 10 |
| Titanium+Chromium | 10+1 | 10 |
| Titanium+Silicon | 10+3 | 10 |
| Titanium+Iron | 10+2 | 10 |
| Zirconium+Titanium | 10+5 | 10 |
| Zirconium+Chromium | 10+1 | 10 |
| Zirconium+Silicon | 10+3 | 10 |
| Zirconium+Iron | 10+2 | 10 |
| Tantalum+Niobium | 10+5 | 10 |
| Chromium+Iron | 10+5 | 10 |
| Titanium+Chromium+Iron | 10+1+2 | 10 |
| Zirconium+Titanium+Silicon+Iron | 10+5+3+3 | 10 |
| Tantalum+Niobium+Iron+Manganese | 10+5+3+3 | 10 |

Preferably, the total content of oxygen plus nitrogen should not exceed 10% by weight, but optimum corrosion resistance to basic oxygen furnace slag is attained by keeping this total content to no more than 5% by weight and desirably as low as 1% by weight. Minimizing the impurities to as low as 1% by weight will also assure optimum properties.

While the amount of free carbon or graphite, broadly speaking, can be as low as 2% by weight, this limit tends to include some fused cast bodies or products possessing only minimal improvement in thermal shock resistance that is possible with this invention. For assurance of outstandingly superior thermal shock resistance, the free carbon or graphite content should be at least 7%.

Bodies with graphite or free carbon in excess of 40% (or in some cases only greater than 20%) by weight are particularly unique in that they are comparable to pure graphite for many applications, but without certain disadvantages of the latter material. Thus, for example, these very high graphite content bodies are superior to pure graphite in that they have greater oxidation resistance, greater corrosion and/or erosion resistance and greater strength.

Although the term "alloy" is more commonly applied to substances composed of only two or more metals that are dissolved in each other in the molten state and then solidified, due to the similar and/or analogous nature of the products of this invention, these monolithic bodies can be said to be composed of an alloy of essentially carbon, boron and the above-noted metallic substances.

We claim:

1. As an article of manufacture, a fused cast refractory consisting essentially of at least 2% by weight of free carbon in the form of an intergrown network intermingling and interlocking with substantially randomly oriented crystals including crystals selected from the group consisting of metallic boride, metallic borocarbide and mixtures thereof, said refractory analytically comprising essentially: (1) carbon; (2) more than 5% by weight of boron; (3) more than 5% by weight of metallic substance selected from the group consisting of titanium, zirconium, hafnium, vanadium, niobium, tantalum, chromium, molybdenum, tungsten, silicon, mixtures of the foregoing first group of metallic elements alone, and mixtures of at least one first group metallic element plus at least one second group metallic element selected from the group consisting of manganese, iron, cobalt and nickel provided the content of the second group elements is not greater than 50% by weight of the total metallic substance content; (4) 0 to 15% by weight of at least one diluent selected from the group consisting of not more than 10% by weight of oxygen and not more than 10% by weight of nitrogen; and (5) a remainder, if any, of 0 to 10% by weight of other elements.

2. As an article of manufacture, a fused cast refractory consisting essentially of at least 7% by weight of free carbon in the form of an intergrown network intermingling and interlocking with substantially randomly oriented crystals including crystals selected from the group consisting of metallic boride, metallic borocarbide and mixtures thereof, said refractory analytically comprising essentially: (1) carbon; (2) at least 10% by weight of boron; (3) at least 10% by weight of metallic substance selected from the group consisting of titanium, zirconium, hafnium, vanadium, niobium, tantalum, chromium, molybdenum, tungsten, silicon, mixtures of the foregoing first group of metallic elements alone, and mixtures of at least one first group metallic element plus at least one second group metallic element selected from the group consisting of manganese, iron, cobalt and nickel provided the content of the second group elements is not greater than 50% by weight of the total metallic substance content; (4) 0 to 10% by weight of at least one diluent selected from the group consisting of oxygen and nitrogen; and (5) a remainder, if any, of 0 to 5% by weight of other elements.

3. As an article of manufacture, a fused cast refractory consisting essentially of at least 2% by weight of free carbon in the form of an intergrown network intermingling and interlocking with substatially randomly oriented crystals including crystals selected from the group consisting of titanium boride, titanium borocarbide and mixtures thereof, said refractory analytically comprising essentially: (1) carbon; (2) at least 10% by weight of boron; (3) at least 10% by weight of titanium; (4) 0 to 10% by weight of at least one diluent selected from the group consisting of oxygen and nitrogen; and (5) a remainder, if any, of 0 to 5% by weight of other elements.

4. As an article of manufacture, a fused cast refractory consisting essentially of at least 2% by weight of free carbon in the form of an intergrown network intermingling and interlocking with substantially randomly oriented crystals including crystals selected from the group consisting of zirconium boride, zirconium borocarbide and mixtures thereof, said refractory analytically comprising essentially: (1) carbon; (2) at least 10% by weight of boron; (3) at least 10% by weight of zirconium, (4) 0 to 10% by weight of at least one diluent selected from the group consisting of oxygen and nitrogen; and (5) a remainder, if any, of 0 to 5% by weight of other elements.

5. As an article of manufacture, a fused cast refractory consisting essentially of at least 2% by weight of free carbon in the form of an intergrown network intermingling and interlocking with substantially randomly oriented crystals including crystals selected from the group consisting of hafnium boride, hafnium borocarbide and mixtures thereof, said refractory analytically comprising essentially: (1) carbon; (2) at least 10% by weight of boron; (3) at least 10% by weight of hafnium; (4) 0 to 10% by weight of at least one diluent selected from the group consisting of oxygen and nitrogen; and (5) a remainder, if any, of 0 to 5% by weight of other elements.

6. As an article of manufacture, a fused cast refractory consisting essentially of at least 2% by weight of free carbon in the form of an intergrown network intermingling and interlocking with substantially randomly oriented crystals including crystals selected from the group consisting of vanadium boride, vanadium borocarbide and mixtures thereof, said refractory analytically comprising essentially: (1) carbon; (2) at least 10% by weight of boron; (3) at least 10% by weight of vanadium; (4) 0 to 10% by weight of at least one diluent selected from the group consisting of oxygen and nitrogen; and (5) a remainder, if any, of 0 to 5% by weight of other elements.

7. As an article of manufacture, a fused cast refractory consisting essentially of at least 2% by weight of free carbon in the form of an intergrown network intermingling and interlocking with substantially randomly oriented crystals including crystals selected from the group consisting of niobium boride, niobium borocarbide and mixtures thereof, said refractory analytically comprising essentially: (1) carbon; (2) at least 10% by weight of boron; (3) at least 10% by weight of niobium; (4) 0 to 10% by weight of at least one diluent selected from the group consisting of oxygen and nitrogen; and (5) a remainder, if any, of 0 to 5% by weight of other elements.

8. As an article of manufacture, a fused cast refractory consisting essentially of at least 2% by weight of free carbon in the form of an intergrown network intermingling and interlocking with substantially randomly oriented crystals including crystals selected from the group consisting of tantalum boride, tantalum borocarbide and mixtures thereof, said refractory analytically comprising essentially: (1) carbon; (2) at least 10% by weight of boron; (3) at least 10% by weight of tantalum; (4) 0 to 10% by weight of at least one diluent selected from the group consisting of oxygen and nitrogen; and (5) a remainder, if any, of 0 to 5% by weight of other elements.

9. As an article of manufacture, a fused cast refractory consisting essentially of at least 2% by weight of free carbon in the form of an intergrown network intermingling and interlocking with substantially randomly oriented crystals including crystals selected from the group consisting of chromium boride, chromium borocarbide and mixtures thereof, said refractory analytically comprising essentially: (1) carbon; (2) at least 10% by weight of boron; (3) at least 10% by weight of chromium; (4) 0 to 10% by weight of at least one diluent selected from the group consisting of oxygen and nitrogen; and (5) a remainder, if any, of 0 to 5% by weight of other elements.

10. As an article of manufacture, a fused cast refractory consisting essentially of at least 2% by weight of free carbon in the form of an intergrown network intermingling and interlocking with substantially randomly oriented crystals including crystals selected from the group consisting of molybdenum boride, molybdenum borocarbide and mixtures thereof, said refractory analytically comprising essentially: (1) carbon; (2) at least 10% by weight of boron; (3) at least 10% by weight of molybdenum; (4) 0 to 10% by weight of at least one diluent selected from the group consisting of oxygen and nitrogen; and (5) a remainder, if any, of 0 to 5% by weight of other elements.

11. As an article of manufacture, a fused cast refractory consisting essentially of at least 2% by weight of free carbon in the form of an intergrown network intermingling and interlocking with substantially randomly oriented crystals including crystals selected from the group consisting of tungsten boride, tungsten borocarbide and mixtures thereof, said refractory analytically comprising essentially: (1) carbon; (2) at least 10% by weight of boron; (3) at least 10% by weight of tungsten; (4) 0 to 10% by weight of at least one diluent selected from the group consisting of oxygen and nitrogen; and (5) a remainder, if any, of 0 to 5% by weight of other elements.

12. As an article of manufacture, a fused cast refractory consisting essentially of at least 2% by weight of free carbon in the form of an intergrown network intermingling and interlocking with substantially randomly oriented crystals including crystals selected from the group consisting of silicon boride, silicon borocarbide and mixtures thereof, said refractory analytically comprising essentially: (1) carbon; (2) at least 10% by weight of boron; (3) greater than 5% by weight of silicon; (4) 0 to 10% by weight of at least one diluent selected from the group consisting of oxygen and nitrogen; and (5) a remainder, if any, of 0 to 5% by weight of other elements.

13. As an article of manufacture, a fused cast refractory consisting essentially of at least 2% by weight of free carbon in the form of an intergrown network intermingling and interlocking with substantially randomly oriented crystals including crystals selected from the group consisting of titanium boride, chromium boride, titanium-chromium boride, titanium borocarbide, chromium borocarbide, titanium-chromium borocarbide and mixtures thereof, said refractory analytically comprising essentially: (1) carbon; (2) at least 10% by weight of boron; (3a) at least 10% by weight of titanium; (3b) at least 1% by weight of chromium; (4) 0 to 10% by weight of at least one diluent selected from the group consisting of oxygen and nitrogen; and (5) a remainder, if any, of 0 to 5% by weight of other elements.

14. As an article of manufacture, a fused cast refractory consisting essentially of at least 2% by weight of free carbon in the form of an intergrown network intermingling and interlocking with substantially randomly oriented crystals including crystals selected from the group consisting of titanium boride, iron boride, titanium-iron boride, titanium borocarbide, iron borocarbide, titanium-iron borocarbide and mixtures thereof, said refractory analytically comprising essentially: (1) carbon; (2) at least 10% by weight of boron; (3a) at least 10% by weight of titanium; (3b) at least 2% by weight of iron; (4) 0 to 10% by weight of at least one diluent selected from the group consisting of oxygen and nitrogen; and (5) a remainder, if any, of 0 to 5% by weight of other elements.

15. As an article of manufacture, a fused cast refractory consisting essentially of at least 2% by weight of free carbon in the form of an intergrown network intermingling and interlocking with substantially randomly oriented crystals including crystals selected from the group consisting of zirconium boride, chromium boride, zirconium-chromium boride, zirconium borocarbide, chromium borocarbide, zirconium-chromium borocarbide and mixtures thereof, said refractory analytically comprising essentially: (1) carbon; (2) at least 10% by weight of boron; (3a) at least 10% by weight of zirconium; (3b) at least 1% by weight of chromium; (4) 0 to 10% by weight of at least one diluent selected from the group consisting of oxygen and nitrogen; and (5) a remainder, if any, of 0 to 5% by weight of other elements.

16. As an article of manufacture, a fused cast refractory consisting essentially of at least 2% by weight of free carbon in the form of an intergrown network intermingling and interlocking with substantially randomly oriented crystals including crystals selected from the groups consisting of zirconium boride, silicon boride, zirconium-silicon boride, zirconium borocarbide, silicon borocarbide, zirconium-silicon borocarbide and mixtures thereof, said refractory analytically comprising essentially: (1) carbon; (2) at least 10% by weight of boron; (3a) at least 10% by weight of zirconium; (3b) at least 3% by weight of silicon; (4) 0 to 10% by weight of at least one diluent selected from the group consisting of oxygen and nitrogen; and (5) a remainder, if any, of 0 to 5% by weight of other elements.

17. As an article of manufacture, a fused cast refractory consisting essentially of at least 2% by weight of free carbon in the form of an intergrown network intermingling and interlocking with substantially randomly oriented crystals including crystals selected from the group consisting of tantalum boride, niobium boride, tantalum-niobium boride, tantalum borocarbide, niobium borocarbide, tantalum-niobium borocarbide and mixtures thereof, said refractory analytically comprising essentially:

(1) carbon; (2) at least 10% by weight of boron; (3a) at least 10% by weight of tantalum; (3b) at least 5% by weight of niobium; (4) 0 to 10% by weight of at least one diluent selected from the group consisting of oxygen and nitrogen; and (5) a remainder, if any, of 0 to 5% by weight of other elements.

18. As an article of manufacture, a fused cast refractory consisting essentially of at least 2% by weight of free carbon in the form of an intergrown network intermingling and interlocking with substantially randomly oriented crystals including crystals selected from the group consisting of simple boride, complex boride, simple borocarbide and complex borocarbide of titanium, chromium and iron and mixtures thereof, said refractory analytically comprising essentially: (1) carbon; (2) at least 10% by weight of boron; (3a) at least 10% by weight of titanium; (3b) at least 1% by weight of chromium; (3c) at least 2% by weight of iron; (4) 0 to 10% by weight of at least one diluent selected from the group consisting of oxygen and nitrogen; and (5) a remainder, if any of 0 to 5% by weight of other elements.

19. As an article of manufacture, a fused cast refractory consisting essentially of more than 20% by weight graphite in the form of an intergrown network intermingling and interlocking with substantially randomly oriented crystals including crystals selected from the group consisting of metallic boride, metallic borocarbide and mixtures thereof, said refractory analytically comprising essentially: (1) carbon; (2) at least 10% by weight boron; (3) at least 10% by weight of metallic substance selected from the group consisting of titanium, zirconium, hafnium, vanadium, niobium, tantalum, chromium, molybdenum, tungsten, silicon, mixtures of the foregoing first group of metallic elements alone, and mixtures of at least one first group metallic element plus at least one second group metallic element selected from the group consisting of manganese, iron, cobalt and nickel provided the content of the second group elements is not greater than 50% by weight of the total metallic substance content; (4) 0 to 10% by weight of at least one diluent selected from the group consisting of oxygen and nitrogen; and (5) a remainder, if any, of 0 to 5% by weight of other elements.

20. As an article of manufacture, a fused cast refractory consisting essentially of more than 40% by weight graphite in the form of an intergrown network intermingling and interlocking with substantially randomly oriented crystals including crystals selected from the group consisting of metallic boride, metallic borocarbide and mixtures thereof, said refractory analytically comprising essentially: (1) carbon; (2) at least 10% by weight boron; (3) at least 10% by weight of metallic substance selected from the group consisting of titanium, zirconium, hafnium, vanadium, niobium, tantalum, chromium, molybdenum, tungsten, silicon, mixtures of the foregoing first group of metallic elements alone, and mixtures of at least one first group metallic element plus at least one second group metallic element selected from the group consisting of manganese, iron, cobalt and nickel provided the content of the second group elements is not greater than 50% by weight of the total metallic substance content; (4) 0 to 10% by weight of at least one diluent selected from the group consisting of oxygen and nitrogen; and (5) a remainder, if any, of 0 to 5% by weight of other elements.

No references cited.

TOBIAS E. LEVOW, *Primary Examiner.*

J. E. POER, *Assistant Examiner.*